(12) United States Patent
Takehana

(10) Patent No.: US 11,951,664 B2
(45) Date of Patent: Apr. 9, 2024

(54) DIE FOR INJECTION MOLDING, PRODUCTION APPARATUS FOR CONTAINER MADE OF RESIN, AND PLUG UNIT

(71) Applicant: NISSEI ASB MACHINE CO., LTD., Nagano (JP)

(72) Inventor: Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 190 days.

(21) Appl. No.: 17/442,877

(22) PCT Filed: Mar. 24, 2020

(86) PCT No.: PCT/JP2020/012860
§ 371 (c)(1),
(2) Date: Sep. 24, 2021

(87) PCT Pub. No.: WO2020/196462
PCT Pub. Date: Oct. 1, 2020

(65) Prior Publication Data
US 2022/0152896 A1    May 19, 2022

(30) Foreign Application Priority Data

Mar. 26, 2019   (JP) ................. 2019-058644

(51) Int. Cl.
*B29C 45/30* (2006.01)
*B29C 45/26* (2006.01)
*B29C 49/06* (2006.01)

(52) U.S. Cl.
CPC .............. *B29C 45/30* (2013.01); *B29C 49/06* (2013.01); *B29C 2045/2683* (2013.01)

(58) Field of Classification Search
CPC ............ B29C 45/30; B29C 2045/2683; B29C 2045/2717; B29C 2045/2733
See application file for complete search history.

(56) References Cited

U.S. PATENT DOCUMENTS

| 5,496,168 A | 3/1996 | Renwick |
| 5,762,976 A | 6/1998 | Brown |

(Continued)

FOREIGN PATENT DOCUMENTS

| DE | 1 850 998 U | 5/1962 |
| DE | 2 160 535 A1 | 6/1973 |

(Continued)

OTHER PUBLICATIONS

Office Action issued to Chinese Patent Application No. 202080023924.7 dated Oct. 24, 2022, along with English translation thereof.

(Continued)

*Primary Examiner* — Arrie L Reuther
*Assistant Examiner* — Virak Nguon
(74) *Attorney, Agent, or Firm* — Greenblum & Bernstein, P.L.C.

(57) ABSTRACT

An injection molding mold including: a flow path through which a molten resin passes; a main body portion including an introduction portion configured to introduce the molten resin into the flow path and a supply portion configured to supply the molten resin from the flow path to a cavity mold; and a plug unit formed with a plug flow path which is a part of the flow path, the plug unit being attachable to the main body portion, in which a prevention portion configured to prevent a pressure loss from occurring when the molten resin passes through the flow path is formed at a portion of the plug flow path where a moving direction of the molten resin changes.

7 Claims, 7 Drawing Sheets

(56) References Cited

U.S. PATENT DOCUMENTS

| | | | |
|---|---|---|---|
| 6,007,108 A | 12/1999 | Brown | |
| 6,382,528 B1 | 5/2002 | Bouti | |
| 6,422,856 B1 * | 7/2002 | Mochizuki | B29C 45/2738 |
| | | | 425/547 |
| 2018/0001539 A1 * | 1/2018 | Horigome | B29C 49/4236 |
| 2018/0079122 A1 | 3/2018 | Aoki et al. | |
| 2018/0079127 A1 | 3/2018 | Aoki | |
| 2020/0108542 A1 | 4/2020 | Horigome et al. | |

FOREIGN PATENT DOCUMENTS

| | | | | |
|---|---|---|---|---|
| EP | 0 523 549 A2 | 1/1993 | | |
| EP | 523549 A2 * | 1/1993 | | B29C 45/2725 |
| EP | 0 716 913 A1 | 6/1996 | | |
| EP | 0 845 345 A1 | 10/1997 | | |
| JP | 5-212758 A | 8/1993 | | |
| JP | 8-39640 A | 2/1996 | | |
| JP | 2002-172658 A | 6/2002 | | |
| JP | 2004-255754 A | 9/2004 | | |
| JP | 2004255754 A * | 9/2004 | | |
| JP | 2005-7797 A | 1/2005 | | |
| KR | 10-0737931 | 7/2007 | | |
| WO | 2016/148189 A1 | 9/2016 | | |
| WO | 2017/002150 A1 | 1/2017 | | |
| WO | 2017/098673 A1 | 6/2017 | | |

OTHER PUBLICATIONS

Extended European Search Report issued European Patent Application No. 20779963.6 dated Nov. 18, 2022.
International Search Report issued in International Patent Application No. PCT/JP2020/012860, dated Jun. 23, 2020, along with an English translation thereof.
Written Opinion of the International Searching Authority issued in International Application No. PCT/JP2020/012860, dated Jun. 23, 2020.

* cited by examiner

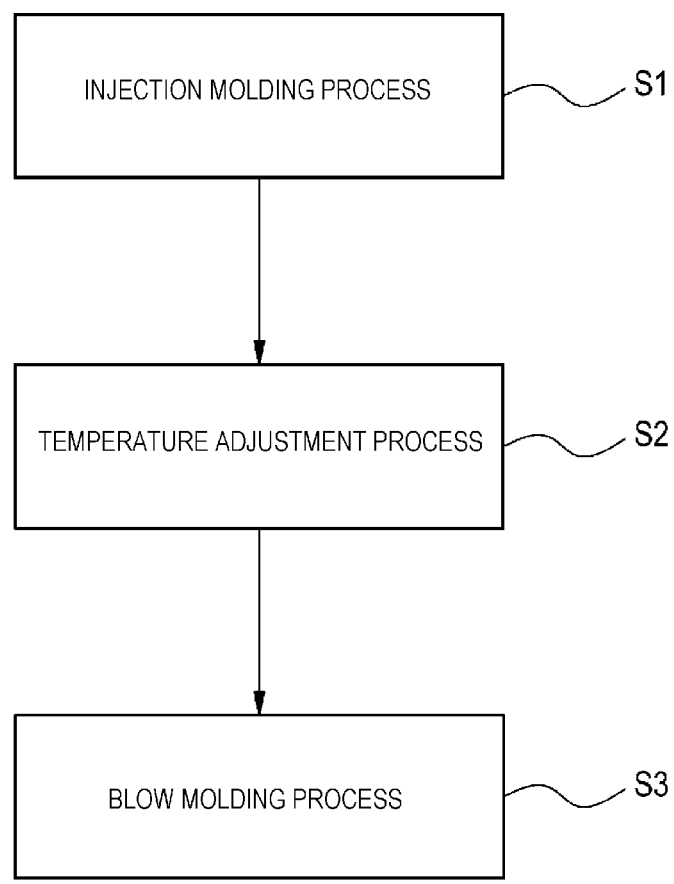

DIE FOR INJECTION MOLDING, PRODUCTION APPARATUS FOR CONTAINER MADE OF RESIN, AND PLUG UNIT

TECHNICAL FIELD

The present disclosure relates to an injection molding mold, a resin container manufacturing apparatus, and a plug unit.

BACKGROUND ART

A hot parison type blow molding method is a blow molding method using residual heat when injection-molding a preform, and, as compared with a cold parison type blow molding method, can manufacture a variety of containers with excellent aesthetic appearance. There are two types of hot parison type blow molding machines, one provided with a temperature adjustment part between an injection molding part and a blow molding part (4 station type) and the other without the temperature adjustment part (2 station type and 3 station type). When the temperature adjustment part is provided, generally, it is easy to adjust a temperature condition of the preform before blowing to a temperature condition suitable for shaping the final container. Further, in the hot parison type blow molding machine, various methods and devices have been developed for the purpose of shortening a molding cycle. For example, a time required for opening and closing an injection molding mold or raising and lowering a stretching device is shorted in Patent Literature 1 and Patent Literature 2, a method for controlling an injection device is changed in Patent Literature 3, and a preform shape that can be demolded early and an injection molding mold therefor are adopted in Patent Literature 4 to shorten the molding cycle.

In addition, Patent Literature 5 discloses a manifold device for a hot runner mold in which a branched and bent runner is formed in the manifold (hot runner mold) main body. Patent Literature 6 discloses a manifold including a molten material passage formed by smooth bending by using so-called diffusion bonding. The manifolds in Patent Literature 5 and Patent Literature 6 are used in an injection molding method (injection molding machine).

CITATION LIST

Patent Literature

Patent Literature 1: JP-A-2005-007797
Patent Literature 2: WO 2016/148189
Patent Literature 3: WO 2017/002150
Patent Literature 4: WO 2017/098673
Patent Literature 5: JP-A-H05-212758
Patent Literature 6: JP-A-H08-039640

SUMMARY OF INVENTION

Technical Problem

In recent years, further improvement in productivity of the hot parison type blow molding machine, specifically, further reduction in molding cycle time has been desired.

In order to speed up the hot parison type blow molding method (shorten the molding cycle), it is conceivable to shorten an injection molding time for the preform. Generally, the hot runner mold is provided between an injection device and an injection cavity mold. Here, for example, when an injection pressure of the injection device is increased in order to increase a flow rate of the molten resin, a configuration of a flow path inside the hot runner is greatly influenced, and a quality of the preform may be reduced.

Therefore, an object of the present disclosure is to provide an injection molding mold (hot runner mold), a resin container manufacturing apparatus, and a plug unit which can shorten the injection molding time while maintaining the quality of the preform.

Solution to Problem

An injection molding mold according to the present disclosure, which can solve the above-described problem, includes:
  a flow path through which a molten resin passes;
  a main body portion including an introduction portion configured to introduce the molten resin into the flow path and a supply portion configured to supply the molten resin from the flow path to a cavity mold; and
  a plug unit formed with a plug flow path which is a part of the flow path, the plug unit being attachable to the main body portion,
  wherein a prevention portion configured to prevent a pressure loss from occurring when the molten resin passes through the flow path is formed at a portion of the plug flow path where a moving direction of the molten resin changes.

According to the above-described configuration, the injection molding mold includes the flow path, the main body portion, and the plug unit attachable to the main body portion. The prevention portion is formed at a portion of the plug flow path, which is formed in the plug unit, where the moving direction of the molten resin changes to prevent a pressure loss from occurring when the molten resin passes through the flow path. Therefore, for example, even when the injection pressure of the injection device is increased in order to increase the flow rate of the molten resin, the molten resin is less likely to deteriorate and the quality of the preform is maintained. In addition, by increasing the injection pressure of the injection device, the time required for the molten resin to be supplied from the introduction portion to the cavity mold via the flow path is also shortened.

Thus, according to the above-described configuration, it is possible to provide an injection molding mold which can shorten the injection molding time while maintaining the quality of the preform.

In addition, a resin container manufacturing apparatus according to the present disclosure, which can solve the above-described problem, includes the above-described injection molding mold according to the present disclosure.

Further, a plug unit according to the present disclosure, which can solve the above-described problem, is a plug unit attachable to a main body portion of an injection molding mold in which a flow path through which a molten resin passes is formed, the plug unit including:
  a plug main body portion formed with a plug flow path which is a part of the flow path,
  wherein a prevention portion configured to prevent a pressure loss from occurring when the molten resin passes through a part of the plug flow path is formed at a portion of the plug flow path where a moving direction of the molten resin changes.

According to the above configuration, the plug unit includes the plug main body portion formed with the plug flow path, and the prevention portion configured to prevent a pressure loss from occurring when the molten resin passes through a part of the plug flow path is formed at a portion of the plug flow path where the moving direction of the molten resin changes. In addition, the plug unit is attachable to the main body portion of the injection molding mold.

Thus, according to the above-described configuration, even when the injection molding mold is, for example, a gun drilling type injection molding mold, the prevention portion can be provided in a part of the flow path.

Advantageous Effects of Invention

According to the present disclosure, it is to provide an injection molding mold (hot runner mold), a resin container manufacturing apparatus, and a plug unit which can shorten the injection molding time while maintaining the quality of the preform.

BRIEF DESCRIPTION OF DRAWINGS

FIG. 5 is a diagram illustrating a flowchart of a method for manufacturing a resin container.

DESCRIPTION OF EMBODIMENTS

Figure 1:
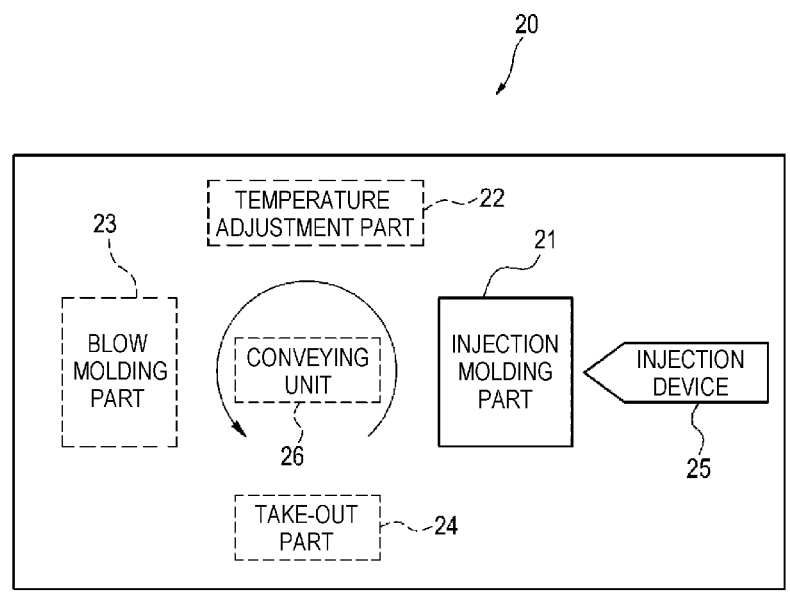
FIG. 1 is a block diagram of a molding machine.

Hereinafter, an example of an embodiment of the present disclosure will be described with reference to the drawings. Dimensions of each member shown in the drawings may be different from the actual dimensions of each member for convenience of description.

Figure 2:
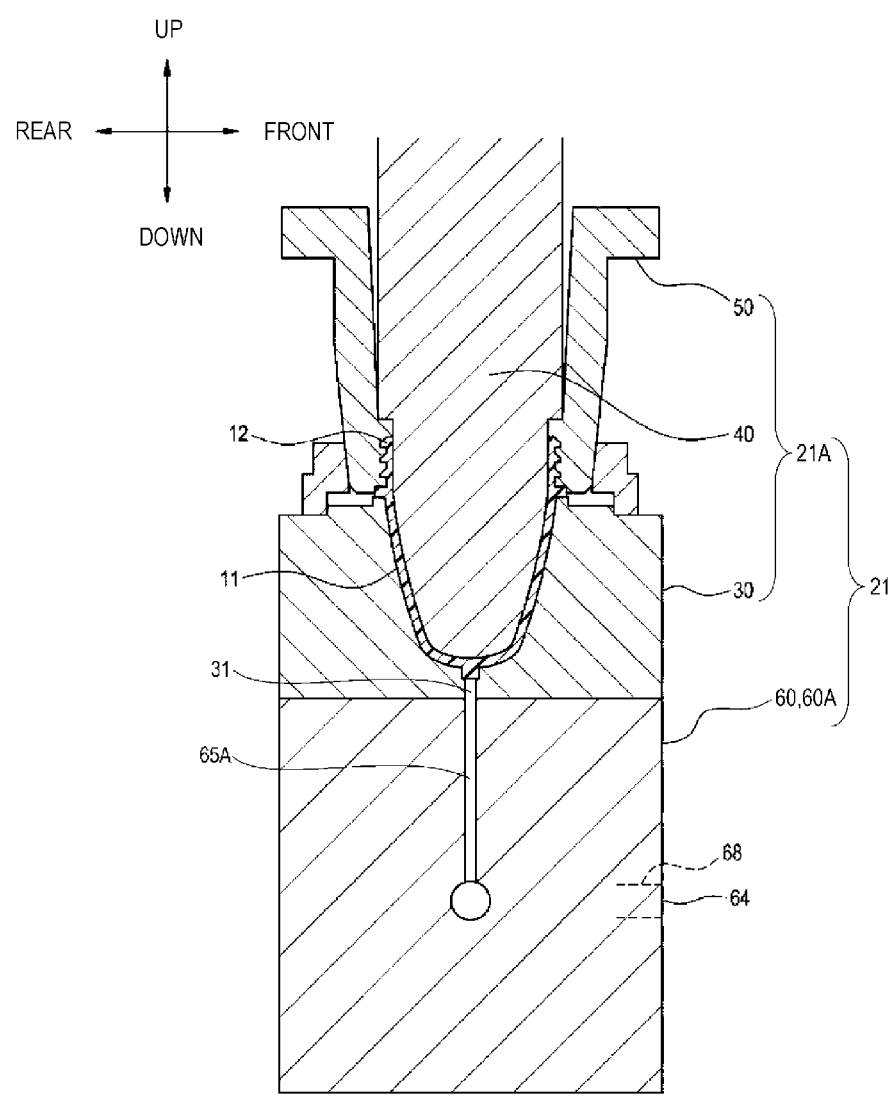
FIG. 2 is a schematic cross-sectional view illustrating an injection molding part.
Figure 3:
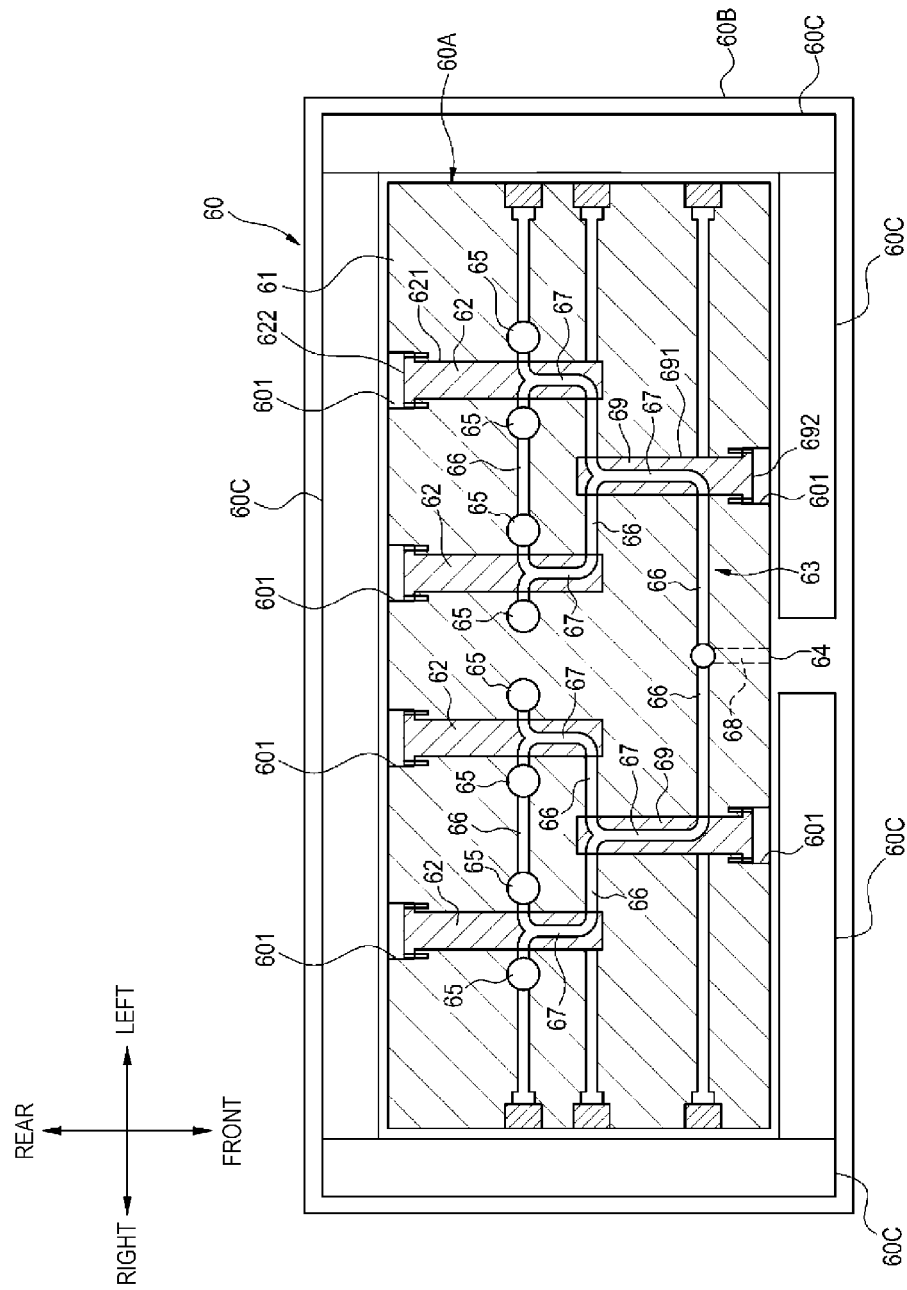
FIG. 3 is a cross-sectional view of an injection molding mold (hot runner mold) according to the present disclosure.
Figure 4A:
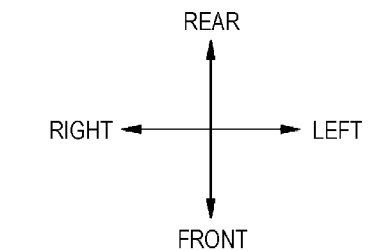
FIG. 4A is a cross-sectional view of a flow path formed by using a conventional plug unit.
Figure 4A:
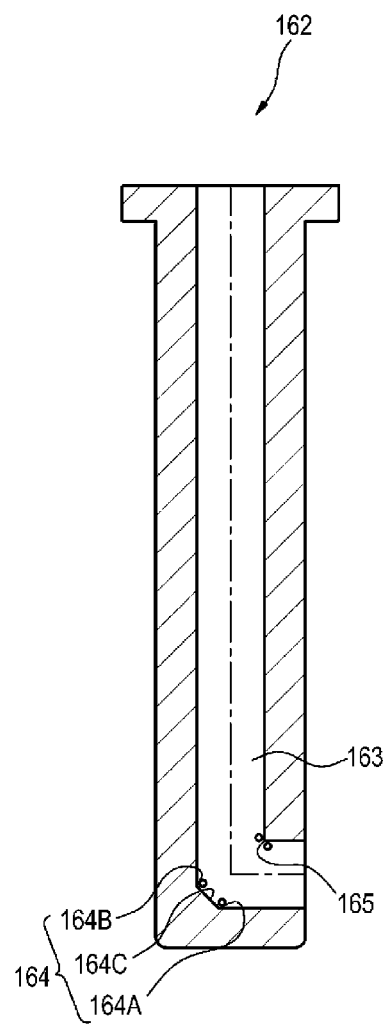
Figure 4B:
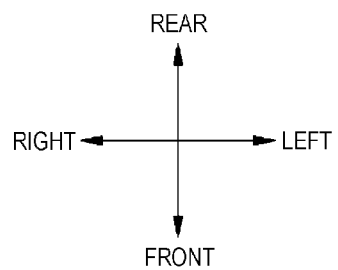
FIG. 4B is a cross-sectional view of a flow path formed by using a conventional plug unit.
Figure 4B:
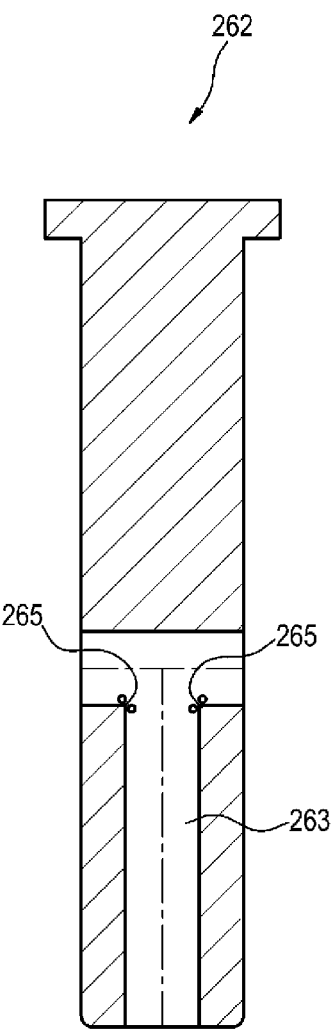
Figure 4C:
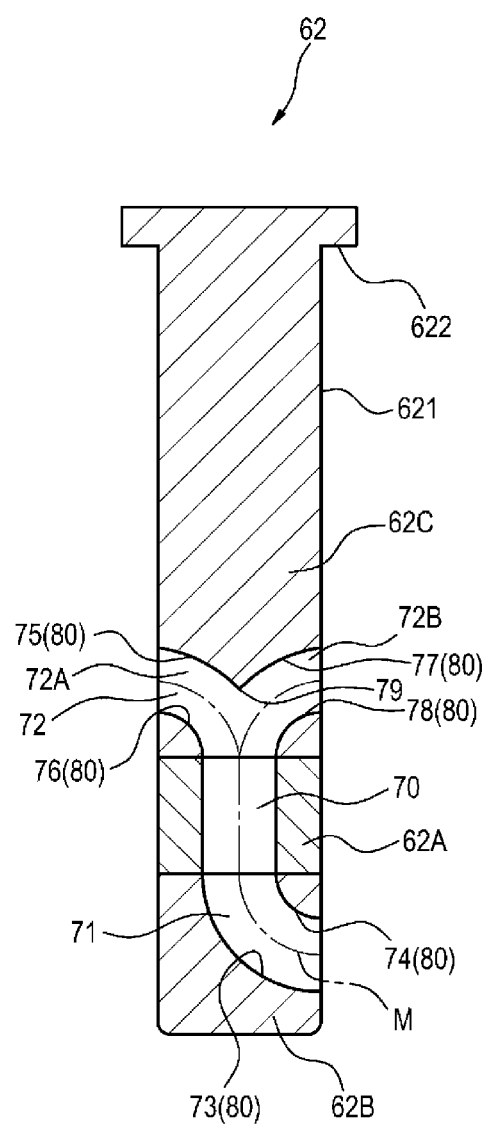
FIG. 4C is a cross-sectional view of a flow path formed by using a plug unit according to the present disclosure.

In the description of the present embodiment, a "left-right direction", a "front-rear direction", and an "up-down direction" are appropriately referred to for convenience of description. These directions are the directions commonly set in the drawings. Here, the "up-down direction" includes an "up direction" and a "down direction". The "front-rear direction" includes a "front direction" and a "rear direction". The "left-right direction" includes a "left direction" and a "right direction". For example, the front-rear direction in FIG. 1 corresponds to a longitudinal direction of a molding machine 20. Each direction in FIG. 2 is a direction when an injection molding part 21 is observed from the right side surface. Each direction in FIG. 3 is a direction when a hot runner mold 60 is observed from above. Further, each direction in FIG. 4A to FIG. 4C is a direction when plug units 62, 162, 262 are observed from the outside front. However, configurations of an injection molding mold, a resin container manufacturing apparatus, and a plug unit according to the present disclosure are not limited to the definition of the direction in FIG. 1 to FIG. 4C.

First, with reference to FIG. 1, the molding machine 20 for manufacturing a resin container will be described. FIG. 1 is a block diagram of the molding machine 20. As shown in FIG. 1, the molding machine 20 includes at least the injection molding part 21 for manufacturing a preform 11, and is connected to an injection device 25 that supplies a resin material as a raw material. The injection device 25 includes a nozzle for injecting the resin material to the injection molding part 21. If necessary, the molding machine 20 includes, on a downstream process side of the injection molding part 21, a temperature adjustment part (post-cooling part) 22 for adjusting or lowering a temperature of the manufactured preform 11, a blow molding part 23 (an example of a blowing device) for manufacturing a container by blowing the preform 11, and a take-out part 24 for taking out the manufactured container. The injection molding mold (hot runner mold 60) according to the present disclosure can be used, for example, when the molding machine 20 is a cold parison type injection molding machine or a hot parison type blow molding machine.

Hereinafter, a case where the injection molding mold according to the present disclosure is used in the hot parison type blow molding will be described in detail. The molding machine 20 includes the injection molding part 21, the blow molding part 23, and the take-out part 24, and may further include the temperature adjustment part 22. These molding parts are provided at positions rotated by a predetermined angle of 90 degrees or 120 degrees with respect to a conveying unit 26. The conveying unit 26 is implemented by a rotary plate or the like, and is configured to convey, to each part, the preform 11 or the container in a state where a neck portion 12 is supported by a neck mold 50 attached to the rotary plate of the conveying unit 26 along with the rotation of the rotary plate, as shown in FIG. 2.

As shown in FIG. 2, the injection molding part 21 includes a preform injection molding unit 21A including an injection cavity mold 30 (hereinafter, simply referred to as a cavity mold 30), an injection core mold 40, and the neck mold 50, and a runner block mold 60A (a part of the hot runner mold 60). The hot runner mold 60 including the runner block mold 60A is an injection molding mold for supplying a molten resin to the preform injection molding unit 21A. An introduction port 64 (an example of an introduction portion) is provided on a side surface of the runner block mold 60A. The introduction port 64 is configured to be in contact with the nozzle of the injection device 25. In addition, inside the runner block mold 60A, an introduction flow path 68 extending from the introduction port 64 to the inside of the runner block mold 60A is provided. The introduction flow path 68 is a flow path for introducing the molten resin injected from the injection device 25 into the flow path in the runner block mold 60A. The introduction port 64 may be provided on a lower surface of the runner block mold 60A. A hollow gate portion 31 is provided on a lower surface of the injection cavity mold 30. On an upper surface of the runner block mold 60A, a hollow runner block nozzle hole 65A connected to a supply portion 65, which will be described later, is provided. The gate portion 31 and the runner block nozzle hole 65A communicate with each other.

A synthetic resin material such as polyester-based resins (e. g., PET: polyethylene terephthalate) from the injection device 25 is poured into a preform-shaped space formed by clamping these molds, and thereby a bottomed preform 11 is manufactured. The resin material is, for example, a thermoplastic resin, and can be appropriately selected depending on the intended use. The resin material injected from the injection device 25 to the injection molding part 21 is a resin in a molten state (molten resin). The preform 11 has an optimum thickness distribution (shape) depending on the container, and a thickness (average thickness, thickness) of a body portion of the preform 11 is set to, for example, 1.0 mm to 5.0 mm, and preferably 1.5 mm to 3.0 mm.

The temperature adjustment part 22 is configured to adjust the temperature of the preform 11 manufactured by the injection molding part 21 to a temperature suitable for final blowing.

The blow molding part 23 is configured to perform blow molding on the preform 11 whose temperature is adjusted by the temperature adjustment part 22 to manufacture a container. The blow molding part 23 includes a bottom mold and a pair of split molds (blow molding cavity molds) that can be opened and closed. The outer shape of the side surface and the bottom surface of the container is defined by clamping the bottom mold and the split mold.

Here, the hot runner mold 60 will be described in detail with reference to FIG. 3 and FIG. 4A to FIG. 4C. As shown in FIG. 3, the hot runner mold 60 includes the runner block mold 60A, a base member 60B, and a plurality of side wall members 60C. The runner block mold 60A is a block member included in the hot runner mold 60. The runner block mold 60A is attached to the base member 60B and is arranged so as to be surrounded by the plurality of side wall members 60C. The runner block mold 60A includes a main body portion 61, a plurality of plug units 62, and a plurality of plug units 69. The runner block mold 60A according to the present embodiment has a total of six plug units, but the number of plug units is not limited to this.

The main body portion 61 is a substantially rectangular parallelepiped or a substantially cylindrical body. The main body portion 61 includes a flow path 63, the introduction port 64, and the supply portion 65. In addition, holes are provided in an upper surface and each side surface of the main body portion 61 for mounting various parts for the runner block mold 60A onto the runner block mold 60A. For example, the upper surface of the main body portion 61 is provided with a hole that functions as the supply portion 65. Further, for example, holes 601 for inserting the plug units 62 and 69 are provided in the side surface of the main body portion 61. The hole 601 is preferably T-shaped in a cross-sectional view in the front-rear direction, but is not limited to this. For example, the hole 601 may have a substantially square shape in the cross-sectional view. Further, in order to maintain the molten state of the resin material, a heater (not shown) is mounted.

The plug unit 62 has a substantially tubular shape with a hollow inside. In addition, the plug unit 62 may be mounted on the runner block mold 60A, and an outer shape thereof in the cross-sectional view in the up-down direction may be a substantially cylindrical body or a substantially prismatic body. The plug unit 62 is preferably T-shaped in the cross-sectional view in the front-rear direction, or may be substantially square. The plug unit 62 can be attached to the main body portion 61. The plug unit 62 includes a plug main body portion 621 and a fixing portion 622. The plug main body portion 621 has a substantially tubular shape and is substantially rectangular in the cross-sectional view. A length of the plug main body portion 621 in the front-rear direction is longer than a length of the plug main body portion 621 in the left-right direction. The fixing portion 622 is substantially rectangular in the cross-sectional view in the front-rear direction. A length of the fixing portion 622 in the front-rear direction is shorter than a length of the fixing portion 622 in the left-right direction. After being inserted into the hole 601, the plug unit 62 is fixed to the hole 601 in a non-rotatable manner by being pinned at the fixing portion 622.

The plug unit 69 includes a plug main body portion 691 and a fixing portion 692. The plug unit 69 has substantially the same configuration as the plug unit 62, but the difference is that a linear flow path formed inside the plug unit 69 is longer than a linear flow path formed inside the plug unit 62.

The flow path 63 is a passage through which the molten resin introduced from the introduction port 64 can pass. The flow path 63 includes a main body flow path 66 formed inside the main body portion 61, and a plug flow path 67 formed inside the plug main body portions 621 and 691. That is, the main body flow path 66 and the plug flow path 67 are a part of the flow path 63.

The main body flow path 66 is linear. Therefore, a moving direction of the molten resin passing through the main body flow path 66 does not change. On the other hand, the plug flow path 67 includes not only a linear flow path but also a curved flow path or a bifurcated flow path.

The plug unit is generally attached to the main body portion of the runner block mold in the case of manufacturing the flow path of the runner block mold by using gun drilling. There are two main reasons for this. The first reason is that, for example, when the flow path of the runner block mold is manufactured by diffusion bonding, the flow path can be designed relatively freely, so that the flow path can be bent without using a plug unit. The second reason is that when the plug unit is attached to the main body portion of the runner block mold, it is necessary to provide a space for inserting the plug unit inside the runner block mold, which causes spatial restrictions. That is, for example, when the flow path of the runner block mold is manufactured by diffusion bonding, a space (for example, an insertion hole) for attaching the plug unit to the main body portion of the runner block mold is not provided in the main body portion of the runner block mold. For these reasons, the plug unit is generally used in the case of manufacturing the flow path of the runner block mold by using gun drilling. Since the flow path 63 of the runner block mold 60A according to the present embodiment is manufactured by using gun drilling, the plug units 62 and 69 are used.

Next, the plug unit 62 will be described with reference to FIG. 4A to FIG. 4C. FIG. 4A and FIG. 4B are cross-sectional views of a flow path formed by using a conventional plug unit 162 and a flow path formed by using a conventional plug unit 262. FIG. 4C is a cross-sectional view of a flow path formed by using the plug unit 62 according to the present disclosure.

As shown in FIG. 4A, a flow path 163 is provided inside the plug unit 162. The flow path 163 includes a plurality of linear flow paths and is substantially L-shaped. Corner portions 164 and 165 are formed at contact points of the linear flow paths. The corner portion 164 includes an end portion 164A, an end portion 164B, and an inclined portion 164C. An angle of the end portion 164A and the end portion 164B in the flow path 163 are each approximately 135 degrees. An angle of the corner portion 164 in the flow path 163 is approximately 90 degrees. An angle of the corner portion 165 in the flow path 163 is approximately 270 degrees. That is, it can be said that in the corner portion 165, a substantially right-angled metal portion of the plug unit 162 protrudes toward the flow path side. Further, it is practically impossible to process the corner portion 165 into an inclined portion or a curved portion (in a state where an R value is large) like the corner portion 164.

As shown in FIG. 4B, a flow path 263 is provided inside the plug unit 262. The flow path 263 includes a plurality of linear flow paths and is substantially L-shaped. Corner portions 265 are formed at contact points of the linear flow paths. An angle of the corner portion 265 in the flow path 263 is approximately 270 degrees. That is, it can be said that in the corner portion 265, a substantially right-angled metal portion of the plug unit 262 protrudes toward the flow path side. Further, it is practically impossible to process the corner portion 265 into an inclined portion or a curved portion (in a state where the R value is large) like the corner portion 164 of the plug unit 162. Therefore, when the molten resin passes through the flow path near the corner portions 164, 165, 265, the molten resin tends to stagnate or drift at the corner portions 164, 165, 265. Further, in the flow path near the corner portions 164, 165, 265, the flow resistance to the molten resin increases, and thus the pressure loss increases. In particular, at the corner portions 165 and 265 where the inclined portion and the curved portion cannot be formed, the molten resin is likely to stagnate or drift, and the pressure loss is large. Here, in the conventional plug unit 162 and plug unit 262, a substantially L-shaped flow path and a substantially T-shaped flow path cannot be integrally formed therein. Therefore, in a case where the conventional plug unit 162 and plug unit 262 are used, the main body flow path 66 may be different from that in FIG. 3.

On the other hand, as shown in FIG. 4C, the plug unit 62 includes a first base member 62A, a second base member 62B, and a third base member 62C. The first base member 62A, the second base member 62B, and the third base member 62C are independent of each other. Therefore, the plug unit 62 may include, for example, only the first base member 62A and the third base member 62C. The first base member 62A is formed with a straight portion 70 in which the molten resin moves straight. The second base member 62B is formed with a curved portion 71 which is a portion where the moving direction of the molten resin changes. The third base member 62C is formed with a branched portion 72 which is a portion where the moving direction of the molten resin branches (changes). The straight portion 70, the curved portion 71, and the branched portion 72 can function as a part of the plug flow path 67. Similar to the plug unit 62, the plug unit 69 also includes a first base member formed with a straight portion, a second base member formed with a curved portion, and a third base member formed with a branched portion.

The straight portion 70 is formed by subjecting the first base member 62A to drilling. The curved portion 71 is formed by subjecting the second base member 62B to machining. The branched portion 72 is formed by subjecting the third base member 62C to machining.

A curved surface 73 is formed on an outer part of an inner peripheral surface of the curved portion 71 (the outer part with respect to a center line M which is a set of midpoints of the plug flow path 67). A curved surface 74 is formed on an inner part of the inner peripheral surface of the curved portion 71 (the inner part with respect to the center line M). Therefore, a radius of curvature of the curved surface 73 is larger than a radius of curvature of the curved surface 74.

The branched portion 72 includes at least a first flow path 72A and a second flow path 72B. Therefore, in the branched portion 72, the plug flow path 67 branches in at least two different directions. A curved surface 75 is formed on an outer part of an inner peripheral surface of the first flow path 72A (the outer part with respect to the center line M). A curved surface 76 is formed on an inner part of the inner peripheral surface of the first flow path 72A (the inner part with respect to the center line M). Therefore, a radius of curvature of the curved surface 75 is larger than a radius of curvature of the curved surface 76. Similarly, a curved surface 77 is formed on an outer part of an inner peripheral surface of the second flow path 72BA (the outer part with respect to the center line M). A curved surface 78 is formed on an inner part of the inner peripheral surface of the second flow path 72B (the inner part with respect to the center line M). Therefore, a radius of curvature of the curved surface 77 is larger than a radius of curvature of the curved surface 78.

A pointed portion 79 is formed at a boundary portion between the curved surface 75 and the curved surface 77. An apex of the pointed portion 79 is pointed toward the front direction of the plug unit 62 (the direction opposite to the moving direction of the molten resin in the straight portion 70). In other words, the boundary portion between the curved surface 75 and the curved surface 77 is formed in a pointed shape. The pointed portion 79 is on a line extending from a midpoint in a width direction of the straight portion 70 toward the moving direction of the molten resin. In addition, the pointed portion 79 is on a straight line formed by connecting a midpoint of a short side of the third base member 62C and a midpoint of a straight portion 70 in the width direction.

As described above, in the plug unit 62 of the present disclosure, regions corresponding to the corner portions 165 of the conventional plug unit 162 exemplified in FIG. 4A and the corner portions 265 of the conventional plug unit 262 shown in FIG. 4B are all curved surfaces (curved roads). Therefore, the stagnation or drift of the molten resin and the pressure loss occurring at the corner portions 165 and 265 can be prevented or reduced. Here, an inner diameter of the straight portion 70 and an inner diameter of the curved portion 71 are equal to each other. An inner diameter of the first flow path 72A and an inner diameter of the second flow path 72B are equal to each other. The inner diameter of the first flow path 72A and the inner diameter of the second flow path 72B are smaller than the inner diameter of the straight portion 70 and the inner diameter of the curved portion 71. Here, the branched portion 72 may be provided with a third flow path (not shown) or a fourth flow path (not shown), if necessary.

Subsequently, a method for manufacturing a resin container will be described. FIG. 5 is an example of a case where the present disclosure is used in a 4-station type injection blow molding apparatus, and is a diagram illustrating a flowchart of the method for manufacturing a resin container. The container is manufactured by an injection molding process 51 in which the preform 11 is subjected to injection molding, a temperature adjustment process S2 in which the temperature of the preform 11 is adjusted, and a blow molding process S3 in which the temperature-adjusted preform 11 is subjected to blow molding to manufacture the container. The container is taken out by opening the neck portion 12 of the container from the neck mold 50.

First, the injection molding process 51 will be described. In the injection molding process 51, the resin material (molten resin) is injected from the injection device 25 into the introduction port 64. As shown in FIG. 3, the molten resin injected toward the introduction port 64 is introduced into the main body flow path 66 formed in the main body portion 61 via the introduction flow path 68. The molten resin that has flowed into the main body flow path 66 flows into the plug flow path 67 formed in the plug unit 69 via the main body flow path 66.

The molten resin that has flowed into the plug flow path 67 passes through the curved portion 71, the straight portion 70, and the branched portion 72 in this order. Each of the curved surfaces 73 and 74 formed on the inner peripheral surface of the curved portion 71 has a curved shape such that the moving direction of the molten resin gradually changes. Therefore, when the molten resin passes through the curved portion 71, the stagnation or drift of the molten resin at the curved portion 71 is less likely to occur. Further, in the curved portion 71, the flow resistance to the molten resin is reduced, and thus the pressure loss is also reduced. In this way, each of the curved surfaces 73 and 74 can function as a prevention portion 80 that prevents the occurrence of the pressure loss and the stagnation or drift of the molten resin.

After passing through the curved portion 71, the molten resin flows into the straight portion 70. In the straight portion 70, the molten resin flows straight in a same direction. Therefore, in the straight portion 70, the stagnation or drift of the molten resin hardly occurs.

After passing through the straight portion 70, the molten resin flows into the branched portion 72. The molten resin that has flowed into the branched portion 72 branches into and flows in two different directions. At this time, since each of the curved surfaces 75 to 78 is curved, when the molten resin passes through the branched portion 72, the stagnation or drift of the molten resin at the branched portion 72 is less likely to occur. Further, in the branched portion 72, the flow resistance to the molten resin is reduced, and thus the pressure loss is also reduced. In this way, each of the curved surfaces 75 to 78 can function as the prevention portion 80 that prevents the occurrence of the pressure loss. Further, since the pointed portion 79 is formed at a portion where the curved surface 75 and the curved surface 77 is connected to each other, the stagnation or drift of the molten resin and the pressure loss are less likely to occur even in the vicinity of the pointed portion 79.

After passing through the branched portion 72, the molten resin flows into the main body flow path 66 again and reaches the supply portion 65. The molten resin that has reached the supply portion 65 is supplied to the cavity mold 30. In this way, the resin material (molten resin) is poured into a preform-shaped space formed by clamping an injection cavity mold, an injection core mold, a neck mold, and the like, and the preform 11 is manufactured. Immediately after the end of a resin filling process or after a cooling process for a certain period of time (minimum) provided after the resin filling process, the molding machine 20 moves the preform 11 from the injection molding part 21 to a post process, for example, the temperature adjustment part (post-cooling part) 22 or the blow molding part.

In this way, when the injection molding part 21 including the hot runner mold 60 provided with the runner block mold 60A is used, it is possible to prevent the occurrence of the pressure loss that occurs when the molten resin passes through the curved portion 71 and the branched portion 72, and it is also possible to reduce the stagnation or drift of the molten resin. Therefore, even by shortening the injection molding time of the preform, a high quality preform can be manufactured. As a result, the time required for the entire molding cycle of the molding machine 20 is also shortened.

Next, returning to FIG. 5, the temperature adjustment process (post-cooling process) S2 will be described. First, the preform 11 is housed in the preform-shaped space of the cavity mold 30. Subsequently, air is sent to the inside of the preform 11 housed in the cavity mold 30, and preliminary blow and cooling blow are performed to bring the preform 11 into close contact with an inner wall of the cavity mold 30. After cooling for a certain period of time, the cooled preform 11 is moved to the blow molding part 23. Since a high quality preform can be formed with the runner block mold 60A, the temperature adjustment process (post-cooling process) S2 can also be completed in a short time. Here, the treatment method in the temperature adjustment process (post-cooling process) S2 is not limited to the above.

Next, the blow molding process S3 will be described. First, the preform is housed in the blow molding part 23 in a state where the bottom mold is stationary and the split mold is open. Subsequently, the preform 11 is stretched downward by a rod member. Then, the preform 11 is inflated to the shape of the container by final blow in which air is sent to the inside of the preform 11, and the container is manufactured. Thereafter, the split mold is opened to demold the container from the blow molding part 23.

The container pulled out from the blow molding part 23 is moved to the take-out part 24 (FIG. 1), and the neck portion 12 of the container is opened from the neck mold 50 (FIG. 2) to take out the container. With the above method, the container is manufactured.

In order to speed up the hot parison type blow molding method (shorten the molding cycle), it is necessary to shorten the injection molding time, particularly the cooling time of the preform. However, shortening the cooling time may reduce the quality of the preform. Therefore, it has been difficult to increase the injection pressure of the injection device without reducing the quality of the preform.

The gun drilling type hot runner is advantageous in terms of cost and the like as compared with the diffusion bonding type hot runner which requires processing with extremely high dimensional accuracy. Therefore, the gun drilling type hot runner is generally adopted when the hot parison type blow molding method is used. However, when the gun drilling type hot runner is adopted, the runner (flow path) can be machined only in a straight line. Therefore, the shape of the corner portion which is the intersection of the runners and the branched portion of the runner where the flow path branches into two is limited to an L-shape or a T-shape having a substantially right-angled shape. That is, when the gun drilling type hot runner is adopted, it is generally not possible to form a curved corner portion or branched portion with a small pressure loss, unlike the corner portion or branched portion in the diffusion bonding type hot runner. This is because in the case of manufacturing the flow path of the runner block mold by using gun drilling, a gun drill can only be moved linearly with respect to the runner block mold.

In a runner region of the corner portion or branched portion, which is substantially right-angled, the stagnation or retention of the resin material is likely to occur. In addition, the flow resistance of the resin material increases, and thus the pressure loss increases.

Conventionally, in order to compensate for this pressure loss, the injection pressure of the injection device has to be increased. However, the method of increasing the injection pressure of the injection device causes a temperature unevenness of the resin material due to induction of shear heat generation in the runner region such as the corner portion, the branched portion, and a narrow portion. As a result, there is a tendency that the quality of the resin material is reduced and the uneven temperature of the preform increases. In addition, the eccentricity of the injection core mold is likely to occur, which is one of the causes of the increase in the uneven thickness of the preform.

When the uneven temperature and/or the uneven thickness of the preform are large, the uneven temperature and/or the uneven thickness of the preform cannot be eliminated with a short temperature adjustment treatment time in high-speed molding.

With the above reasons, it is necessary to improve the conventional gun drilling type hot runner such that the stagnation or drift of the resin material can be reduced, the pressure loss can be reduced, and a high quality preform with less uneven temperature and uneven thickness can be manufactured even in a short time.

Here, the runner block mold 60A according to the present embodiment includes the plug units 62 and 69 that are separate from the main body portion 61. The plug units 62 and 69 each have a size of about 1/40 of the size of the runner block mold 60A, and can be inserted and held from the external holes 601 of the main body portion 61. Therefore, when a flow path such as a gentle curved portion and branched portion is to be formed in addition to a linear flow path in the runner block mold 60A, the linear flow path can be provided in the main body portion 61, and the curved portion and the branched portion can be separately provided in the plug units 62 and 69. The linear flow path can be easily formed by performing gun drilling on the main body portion 61 as in the conventional case. On the other hand, the curved portion and the branched portion of the flow path can be easily formed to have a desired diameter and shape by cutting the inside of the plug units 62 and 69 by machining or the like. Therefore, by making the plug units 62 and 69 forming the plug flow path 67 including the curved portion 71 or the branched portion 72 into members separate from the main body portion 61, the runner block mold 60A having an optimum flow path can be easily realized without relying on the diffusion bonding method.

In addition, the plug unit 62 according to the present embodiment includes the first base member 62A, the second base member 62B, and the third base member 62C. The plug unit 69 also includes the first base member formed with a straight portion, the second base member formed with a curved portion, and the third base member formed with a branched portion. Therefore, for example, in a case where a flow path is to be formed inside the plug unit 62, the inside of each base member may be cut by machining each base member. Therefore, the plug flow path 67 including the curved portion 71 and the branched portion 72 can be easily formed inside the plug unit 62.

According to the injection molding mold (hot runner mold 60) and the resin container manufacturing apparatus (molding machine 20) of the present embodiment, the runner block mold 60A includes the flow path 63, the main body portion 61, and the plug units 62 and 69. For example, in the plug unit 62, the prevention portion 80 is formed in the curved portion 71 and the branched portion 72, which are portions of the plug flow path 67 of the plug unit 62 where the moving direction of the molten resin changes. Therefore, the occurrence of the pressure loss and the deterioration of the molten resin when the molten resin passes through the curved portion 71 and the branched portion 72 are prevented. Further, unlike the case of the conventional hot runner mold, the injection pressure does not have to be increased more than necessary. Therefore, a high quality preform can be manufactured by reducing the deterioration (burning) of the resin due to stagnation and reducing uneven temperature and uneven thickness due to a high injection pressure that compensates for the pressure loss.

According to the injection molding mold (hot runner mold 60) and the resin container manufacturing apparatus (molding machine 20) of the present embodiment, curved surfaces are formed on the inner part and the outer part of the inner peripheral surface of the curved portion 71 and the branched portion 72. Therefore, the occurrence of the pressure loss when the resin material passes through the curved portion 71 and the branched portion 72 can be prevented, and the resin material is less likely to deteriorate.

According to the injection molding mold (hot runner mold 60) and the resin container manufacturing apparatus (molding machine 20) of the present embodiment, the pointed portion 79 is formed at the boundary portion between the curved surface 75 and the curved surface 77. In other words, the boundary portion between the curved surface 75 and the curved surface 77 is formed in a pointed shape. Therefore, the stagnation or drift of the molten resin is less likely to occur in the vicinity of the pointed portion 79. As a result, the occurrence of the pressure loss when the molten resin passes through the branched portion 72 can be reduced, and the resin material is less likely to deteriorate.

According to the injection molding mold (hot runner mold 60), the resin container manufacturing apparatus (molding machine 20), and the plug units 62 and 69 of the present embodiment, the plug units 62 and 69 each include a plurality of base members. Therefore, for example, even when the design of the hot runner mold 60 is changed, the length of the plug flow path 67 can be adjusted and the diameter or the radius of curvature of the plug flow path 67 can be processed and/or adjusted quickly and easily.

According to the injection molding mold (hot runner mold 60), the resin container manufacturing apparatus (molding machine 20) and the plug units 62 and 69 of the present embodiment, the plug unit 62 includes the first base member 62A formed with the straight portion 70, the second base member 62B formed with the curved portion 71, and the third base member 62C formed with the branched portion 72. The first base member 62A is arranged between the second base member 62B and the third base member 62C. Similar to the plug unit 62, the plug unit 69 also includes the first base member formed with the straight portion, the second base member formed with the curved portion, and the third base member formed with the branched portion, and the first base member is arranged between the second base member and the third base member. Therefore, according to the hot runner mold 60, the molding machine 20, and the plug units 62 and 69, the length of the flow path 63 formed in the plug units 62 and 69 and the moving direction of the flow path 63 can be adjusted.

The present invention is not limited to the above embodiment and may be modified or improved as appropriate. Materials, shapes, sizes, numerical values, forms, numbers, arrangement places, and the like of components in the above embodiment are optional and not limited as long as the object of the present disclosure can be achieved.

In the injection molding mold (hot runner mold 60) of the above embodiment, the shape of the surface formed on the outer side and the inner side of the inner peripheral surface of the curved portion 71 and the branched portion 72 is curved, but the present disclosure is not limited to this. For example, the shape of the surface may be a part of a circumference of a substantially regular polygon.

In the above embodiment, the plug unit 62 according to the present embodiment includes the first base member 62A, the second base member 62B, and the third base member 62C, but the present disclosure is not limited to this example. For example, the plug unit 62 may have a configuration including the second base member 62B and the third base member 62C, a configuration including the first base member 62A and the second base member 62B, or a configuration including the first base member 62A and the third base member 62C. Similar to the plug unit 62, the plug unit 69 may also have a configuration including the second base member and the third base member, a configuration including the first base member and the second base member, or a configuration including the first base member and the third base member.

In the above embodiment, the molding machine 20 is a so-called 4-station type molding machine in which the temperature adjustment part 22 is provided between the injection molding part 21 and the blow molding part 23. Alternatively, for example, the molding machine 20 may be a so-called 2-station type or 3-station type blow molding machine in which the temperature adjustment part 22 is not provided, or an injection molding device in which the blow molding part 23 is not provided.

Hereinafter, aspects extracted from the above embodiment and modifications thereof will be listed.

[1] An injection molding mold including:
a flow path through which a molten resin passes;
a main body portion including an introduction portion configured to introduce the molten resin into the flow path and a supply portion configured to supply the molten resin from the flow path to a cavity mold; and
a plug unit formed with a plug flow path which is a part of the flow path, the plug unit being attachable to the main body portion,
wherein a prevention portion configured to prevent a pressure loss from occurring when the molten resin passes through the flow path is formed at a portion of the plug flow path where a moving direction of the molten resin changes.

[2] The injection molding mold according to [1],
wherein the plug flow path includes a curved portion where the moving direction of the molten resin changes, and
wherein the prevention portion is formed as a curved surface on an inner part of an inner peripheral surface of the curved portion.

[3] The injection molding mold according to [2],
wherein the prevention portion is further formed as a curved surface on an outer part of the inner peripheral surface of the curved portion.

[4] The injection molding mold according to any one of [1] to [3],
wherein the plug flow path includes a branched portion that branches at least in two different directions,
wherein the branched portion includes a first flow path and a second flow path, and
wherein the prevention portion is formed as a curved surface on an inner part of an inner peripheral surface of the first flow path and formed as a curved surface on an inner part of an inner peripheral surface of the second flow path.

[5] The injection molding mold according to [4],
wherein the prevention portion is further formed as a curved surface on an outer part of the inner peripheral surface of the first flow path and formed as a curved surface on an outer part of the inner peripheral surface of the second flow path, and
wherein a boundary portion between the outer part of the inner peripheral surface of the first flow path and the outer part of the inner peripheral surface of the second flow path is formed in a pointed shape.

[6] The injection molding mold according to any one of [1] to [5],
wherein the plug unit includes a plurality of base members.

[7] The injection molding mold according to [6],
wherein the plurality of base members includes:
a first base member formed with a straight portion of the flow path where the molten resin moves straight;
a second base member formed with a curved portion of the flow path where the moving direction of the molten resin changes; and
a third base member formed with a branched portion of the flow path where the moving direction of the molten resin branches, and
wherein the first base member is disposed between the second base member and the third base member.

[8] A resin container manufacturing apparatus including the injection molding mold according to any one of [1] to [7].

[9] A plug unit attachable to a main body portion of an injection molding mold in which a flow path through which a molten resin passes is formed, the plug unit including:
a plug main body portion formed with a plug flow path which is a part of the flow path,
wherein a prevention portion configured to prevent a pressure loss from occurring when the molten resin passes through a part of the plug flow path is formed at a portion of the plug flow path where a moving direction of the molten resin changes.

This application is based on a Japanese Patent Application (Japanese Patent Application No. 2019-058644) filed Mar. 26, 2019, the contents of which are incorporated herein by reference.

The invention claimed is:

1. An injection molding mold comprising:
a flow path through which a molten resin passes;
a main body portion including an introduction portion configured to introduce the molten resin into the flow path and a supply portion configured to supply the molten resin from the flow path to a cavity mold; and
a plug unit formed with a plug flow path which is a part of the flow path, the plug unit being attachable to the main body portion,
wherein a prevention portion configured to prevent a pressure loss from occurring when the molten resin passes through the flow path is formed at a portion of the plug flow path where a moving direction of the molten resin changes,
wherein the plug unit includes a plurality of base members,
wherein the plurality of base members includes:
a first base member formed with a straight portion of the flow path where the molten resin moves straight;
a second base member formed with a curved portion of the flow path where the moving direction of the molten resin changes; and
a third base member formed with a branched portion of the flow path where the moving direction of the molten resin branches, and
wherein the first base member is disposed between the second base member and the third base member.

2. The injection molding mold according to claim 1,
wherein the plug flow path includes a curved portion where the moving direction of the molten resin changes, and
wherein the prevention portion is formed as a curved surface on an inner part of an inner peripheral surface of the curved portion.

3. The injection molding mold according to claim 2,
wherein the prevention portion is further formed as a curved surface on an outer part of the inner peripheral surface of the curved portion.

4. The injection molding mold according to claim 1,
wherein the plug flow path includes a branched portion that branches at least in two different directions,
wherein the branched portion includes a first flow path and a second flow path, and wherein the prevention portion is formed as a curved surface on an inner part of an inner peripheral surface of the first flow path and formed as a curved surface on an inner part of an inner peripheral surface of the second flow path.

5. The injection molding mold according to claim 4,
wherein the prevention portion is further formed as a curved surface on an outer part of the inner peripheral surface of the first flow path and formed as a curved surface on an outer part of the inner peripheral surface of the second flow path, and
wherein a boundary portion between the outer part of the inner peripheral surface of the first flow path and the outer part of the inner peripheral surface of the second flow path is formed in a pointed shape.

6. A resin container manufacturing apparatus comprising the injection molding mold according to claim 1.

7. A plug unit attachable to a main body portion of an injection molding mold in which a flow path through which a molten resin passes is formed, the plug unit comprising:

a plug main body portion formed with a plug flow path which is a part of the flow path,
wherein a prevention portion configured to prevent a pressure loss from occurring when the molten resin passes through a part of the plug flow path is formed at a portion of the plug flow path where a moving direction of the molten resin changes,
wherein the plug unit includes a plurality of base members,
wherein the plurality of base members includes:
a first base member formed with a straight portion of the flow path where the molten resin moves straight;
a second base member formed with a curved portion of the flow path where the moving direction of the molten resin changes; and
a third base member formed with a branched portion of the flow path where the moving direction of the molten resin branches, and
wherein the first base member is disposed between the second base member and the third base member.

\* \* \* \* \*